June 16, 1953 — G. E. HANNA — 2,642,297
COUPLING
Filed Sept. 10, 1948

Inventor:-
GLENN E. HANNA,
By Raymond Wootton
Attorney

Patented June 16, 1953

2,642,297

UNITED STATES PATENT OFFICE 2,642,297

COUPLING

Glenn Eager Hanna, Baltimore, Md., assignor to Breco Manufacturing Company, Baltimore, Md.

Application September 10, 1948, Serial No. 48,620

4 Claims. (Cl. 285—169)

This invention relates to a breakaway coupling intended to maintain a fluid tight seal until such time as a physical separating force of predetermined value is imposed upon its components, at which time, separation will occur.

A coupling of this type is eminently suited as an oxygen connector in aircraft, and particularly in military aircraft where the personnel may be required to jump. Under such circumstances, it becomes unnecessary for the personnel to take time to manually disconnect their oxygen breathing apparatus, since the predetermined separating force will have been designed for such contingencies.

The present invention may be characterized as a breakaway coupling comprising a socket having a wall penetrated by a detent pocket, a detent received in the pocket, a detent operator having an inclined surface in bearing engagement with the detent, a spring biasing the operator towards a detent confining position and a plug for the socket, the plug having a recess registrable with the detent and an inclined wall engageable with the detent to transmit movement to the operator in opposition to the spring. The movement transmitted to the operator in opposition to the spring will result from a separating force when the coupling is to be broken, and a second inclined wall will be provided on the plug to transmit similar movement to the operator when the coupling members are being engaged. Where such a plurality of inclined walls are provided on the plug, their inclination will be of opposite sign so that one of them will be effective during a coupling operation and the other during an uncoupling operation. There are preferably a plurality of detent pockets in the socket member, each receiving a detent element so as to distribute the forces imposed on the operator during introduction and removal of the plug.

Expressed differently, the breakaway coupling of the present invention may be said to comprise plug and socket members, one of the members having a perforated wall defining a detent pocket, a detent received in the pocket, means carried by the perforated member biasing the detent towards a projected position for securing the members together, and means carried by the other of the members for shifting the detent to a retracted position in opposition to the biasing means during coupling and uncoupling operations. Sealing means carried by one of the members preferably defines a seat for the other. The detent or detents may be defined by one or more balls received in the pockets of the perforated member, the pockets being preferably radial and equally spaced circumferentially of the socket member. The assembled coupling preferably provides an unobstructed bore of uniform cross section where it is desired to avoid any separating effects resulting from fluid under pressure within the coupling. When the components have become unseated with respect to the sealing ring, any internal pressure within the coupling will assist in the separation of the members.

A more complete understanding of the invention will follow a more detailed description based upon the accompanying drawing wherein.

Figure 1:
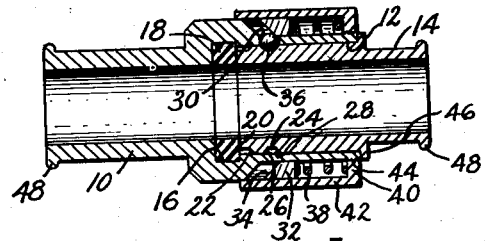
Fig. 1 is a sectional elevation of the assembled coupling.

A socket member 10 is provided with a counterbore 12 to receive a plug 14. The counterbore terminates at a larger counterbore 16 defining a seat for a gasket or sealing member 18 against which the leading end 20 of the plug abuts when the members are assembled as shown in Fig. 1. The leading end of the plug is slightly reduced beyond an inclined surface 22 and at an intermediate portion thereof, the plug provides a recess 24 defined by oppositely inclined surfaces 26 and 28.

The socket wall is perforated to provide radial pockets 30, preferably at least three, equally spaced circumferentially thereof to provide a suitable centering action for the plug. An annular ring 32 embraces the socket so that its inclined surface 34 bears against the detents 36 contained in the pockets under the influence of a spring 38 whose opposite end abuts a shoulder 40 formed on a confining sleeve 42 secured to the threads 44 provided at the open end of the socket. As depicted in Fig. 1, the plug is provided with an intermediate flange 46 to limit its penetration into the socket. The remote end of the plug and socket members are formed with enlargements 48 of a type well known for securing the ends of flexible hose material.

Figure 2:
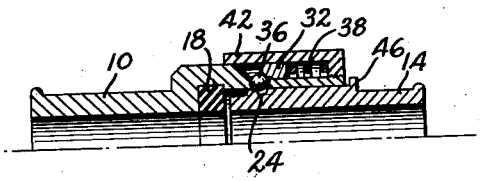
Fig. 2 is a fragmentary sectional elevation showing the relationship of the parts as a separating movement begins.
Figure 3:
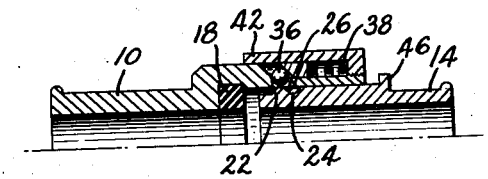
Fig. 3 is a fragmentary sectional elevation showing the relationship of the parts after the separating force has continued beyond that depicted in Fig. 2.

When a separating force is imposed upon the plug and socket members, the balls will be urged outwardly as they ride upwardly on the inclined surface 26, resulting in movement of the annulus 32 against the force of its biasing spring 38 which becomes compressed as depicted in Fig. 2 during an early phase of the separating operation and farther compressed as depicted in Fig. 3 during a later phase of the operation. In fact, as depicted in Fig. 3, the balls have been moved outwardly to their full extent under the influence of the movement of the plug so that further separating movement will permit the plug to be completely withdrawn from the socket towards which condition it can be moved without further restraint from a position such as that shown in Fig. 4.

Figure 4:
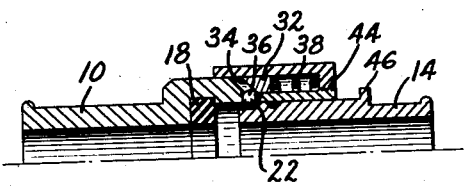
Fig. 4 is a fragmentary sectional elevation depicting the relationship of the parts assumed immediately after the detent has released the parts for separation and immediately before the detent is operated for coupling the parts.

Fig. 4 also represents the positions assumed by the parts during a coupling operation just before the inclined surface 22 near the leading end of the plug causes the balls to move outwardly to transmit movement to the annulus or operator 32 against the force of its spring 38. Further coupling movement of the members will cause them to assume progressive positions as depicted in Figs. 3, 2 and 1 respectively.

It will be clear that the predetermined force which will be effective to separate the members can be varied by selecting different tapers for the inclined surface 34 of the operator or annulus 32, by inserting springs 38 of different strengths and/or by adjusting the position of the confining sleeve 42 with respect to the socket to compress the spring more or less.

With the coupling members and the sealing member defining a bore of constant cross section as shown in Fig. 1, there will be no appreciable separating effect caused by the pressure of fluid within the coupling. However, when a separating effect has been initiated so that the end of the plug is withdrawn from the sealing member, as depicted in Fig. 2, any fluid pressure within the coupling will assist the separating action.

It will be clear to those skilled in the art that the parts will be designed against unintended separation at forces below that for which they are designed. However, when a pilot or other aviation personnel are forced to jump for their lives, the coupling will separate automatically without any requirement for the expenditure of any precious moments. It will also be clear to those skilled in the art as it has been clear to the present inventor that there are many other applications for which couplings of this type are well suited. Accordingly, although only one specific form of the invention has been illustrated and described, the invention should not be restricted thereto beyond the scope of the appended claims.

I claim:

1. A breakaway coupling separable in response to a predetermined tensile force comprising a socket having a wall penetrated by a detent pocket, a detent received in said pocket and movable in a radial path, a detent operator having an inclined surface in bearing engagement with said detent, a helical spring coaxial with said socket biasing said operator towards a detent confining position, a housing member fixed to said socket enclosing said operator and spring, and a plug for said socket, said plug having a recess registrable with said detent and an inclined wall disposed at an acute angle to said path engageable with said detent to impart radial movement thereto and thereby transmit separating force to said operator in opposition to said spring.

2. A breakaway coupling separable in response to a predetermined tensile force comprising a socket having an inner wall penetrated by a plurality of detent pockets, a detent received in each of said pockets and movable in a radial path, a detent operator having an inclined surface in bearing engagement with said detents, a helical spring coaxial with said socket biasing said operator towards a detent confining position, an outer wall axially fixed to said inner wall housing said operator and spring, and a plug for said socket, said plug having a recess registrable with said detents and an inclined wall disposed at an acute angle to said path engageable with said detents to impart radial movement thereto and thereby transmit movement to said operator in opposition to said spring.

3. A breakaway coupling separable in response to a predetermined tensile force comprising plug and socket members, one of said members having spaced walls secured against relative movement, one of said walls containing perforations defining detent pockets, detent balls received in said pockets between said walls and movable in a radial path, a helical spring carried by and coaxial with said one member between said walls biasing said balls towards projected positions for securing said members together, and ball engaging means disposed at an acute angle to said path carried by the other of said members for shifting said balls to retracted positions in opposition to said biasing means during coupling and uncoupling operations.

4. A breakaway coupling separable in response to a predetermined tensile force comprising plug and socket members, said socket member having an inner wall penetrated by a detent pocket, a detent received in said pocket and movable in a radial path, said plug member having a recess registrable with said detent and defining a seat therefor, a helical spring coaxial with said socket member biasing said detent towards said seat, an outer wall secured against movement relative to said inner wall housing said spring, and an inclined wall disposed at an acute angle to said path and carried by said plug member engageable with said detent to force it from said seat in opposition to said spring in response to tension applied to said members.

GLENN EAGER HANNA.

References Cited in the file of this patent

UNITED STATES PATENTS

| Number | Name | Date |
|---|---|---|
| 751,345 | Saunders | Feb. 2, 1904 |
| 994,804 | Wahlstrom | June 13, 1911 |
| 1,175,402 | Baylis | Mar. 14, 1916 |
| 1,456,290 | Tell | May 22, 1923 |
| 1,527,383 | Solliday | Feb. 24, 1925 |
| 1,635,909 | Tobeler | July 12, 1927 |
| 1,770,912 | Clapp | July 22, 1930 |
| 2,069,377 | Matthiessen | Feb. 2, 1937 |
| 2,092,116 | Hansen | Sept. 7, 1937 |
| 2,394,236 | Eastman | Feb. 5, 1946 |
| 2,429,202 | Estill et al. | Oct. 21, 1947 |
| 2,466,884 | English et al. | Apr. 12, 1949 |